United States Patent
Dubreuil et al.

(10) Patent No.: US 11,305,883 B2
(45) Date of Patent: Apr. 19, 2022

(54) CIRCULATING COOLANT FLUID IN HYBRID ELECTRICAL PROPULSION SYSTEMS

(71) Applicant: Pratt & Whittney Canada Corp., Longueuil (CA)

(72) Inventors: Jean Dubreuil, Boucherville (CA); Eric LaTulipe, Sainte-Julie (CA)

(73) Assignee: United Technologies Advanced Projects, Inc., Rockford, IL (US)

( * ) Notice: Subject to any disclaimer, the term of this patent is extended or adjusted under 35 U.S.C. 154(b) by 108 days.

(21) Appl. No.: 16/706,281

(22) Filed: Dec. 6, 2019

(65) Prior Publication Data

US 2020/0277075 A1  Sep. 3, 2020

Related U.S. Application Data

(60) Provisional application No. 62/812,439, filed on Mar. 1, 2019.

(51) Int. Cl.
*B64D 33/08* (2006.01)
*B64D 27/02* (2006.01)
(Continued)

(52) U.S. Cl.
CPC ............ *B64D 33/08* (2013.01); *B64D 27/02* (2013.01); *B64D 27/24* (2013.01); *B64D 35/02* (2013.01);
(Continued)

(58) Field of Classification Search
CPC ........ B64D 33/08; B64D 27/02; B64D 27/24; B64D 35/02; B64D 2027/026;
(Continued)

(56) References Cited

U.S. PATENT DOCUMENTS 4,869,071 A  9/1989  Wehner et al.
8,884,479 B2  11/2014  Burnett et al.
(Continued)

FOREIGN PATENT DOCUMENTS

CA  3033189 A1  2/2018
DE  102004036296 A1  2/2006
(Continued)

OTHER PUBLICATIONS

PCT International Search Report and Written Opinion dated Aug. 7, 2020, issued during the prosecution of PCT International Patent Application No. PCT/US2019/065021.

*Primary Examiner* — Lindsay M Low
(74) *Attorney, Agent, or Firm* — Locke Lord LLP; Scott D. Wofsy; Joshua L. Jones

(57) ABSTRACT

A hybrid propulsion system includes a heat engine configured to drive a heat engine shaft. An electric motor configured to drive a motor shaft. A transmission system is connected to receive rotational input power from each of the heat engine shaft and the motor shaft and to convert the rotation input power to output power. A first lubrication/coolant system is connected for circulating a first lubricant/coolant fluid through the heat engine. A second lubricant/coolant system in fluid isolation from the first lubrication/coolant system is connected for circulating a second lubricant/coolant fluid through the electric motor.

21 Claims, 5 Drawing Sheets

(51) Int. Cl.
- *B64D 27/24* (2006.01)
- *F01M 11/00* (2006.01)
- *F01M 5/00* (2006.01)
- *F01M 1/02* (2006.01)
- *F01M 1/10* (2006.01)
- *F01M 11/03* (2006.01)
- *F16H 57/04* (2010.01)
- *F01D 25/18* (2006.01)
- *F01D 25/12* (2006.01)
- *H02K 7/116* (2006.01)
- *H02K 9/19* (2006.01)
- *H02K 9/26* (2006.01)
- *H02K 11/25* (2016.01)
- *B64D 35/02* (2006.01)

(52) U.S. Cl.
CPC ............ *F01D 25/12* (2013.01); *F01D 25/18* (2013.01); *F01M 1/02* (2013.01); *F01M 1/10* (2013.01); *F01M 5/002* (2013.01); *F01M 11/0004* (2013.01); *F01M 11/03* (2013.01); *F16H 57/0404* (2013.01); *F16H 57/0416* (2013.01); *F16H 57/0436* (2013.01); *F16H 57/0475* (2013.01); *F16H 57/0476* (2013.01); *H02K 7/116* (2013.01); *H02K 9/19* (2013.01); *H02K 9/26* (2013.01); *H02K 11/25* (2016.01); *B64D 2027/026* (2013.01); *F01M 2005/004* (2013.01); *F01M 2250/60* (2013.01)

(58) Field of Classification Search
CPC .......... H02K 11/25; H02K 7/116; H02K 9/19; F01D 25/12; F01D 25/18; F01M 1/10; F01M 5/002; F01M 11/0004; F01M 11/03; F01M 2005/004; F01M 2250/60; F16H 57/0404; F16H 57/0416; F16H 57/0475; F16H 57/0476; H02D 9/26
USPC .......................................................... 60/698
See application file for complete search history.

(56) References Cited

U.S. PATENT DOCUMENTS

| | | | |
|---|---|---|---|
| 9,006,942 B2 | 4/2015 | Lemmers, Jr. et al. | |
| 9,306,433 B2 | 4/2016 | Sten et al. | |
| 10,086,946 B1 | 10/2018 | Zywiak et al. | |
| 10,138,899 B2 | 11/2018 | Joubert et al. | |
| 10,150,570 B2 | 12/2018 | Joubert et al. | |
| 10,177,424 B1 | 1/2019 | Melack et al. | |
| 2006/0196633 A1 | 9/2006 | Mahjoub | |
| 2006/0237583 A1 | 10/2006 | Fucke et al. | |
| 2007/0068712 A1 | 3/2007 | Carnahan | |
| 2007/0163822 A1 | 7/2007 | Grieve | |
| 2008/0023177 A1 | 1/2008 | Hassett et al. | |
| 2010/0006073 A1 | 1/2010 | Jatkar | |
| 2010/0133031 A1 | 6/2010 | Mendler | |
| 2010/0175377 A1 | 7/2010 | Garrard et al. | |
| 2010/0219779 A1 | 9/2010 | Bradbrook | |
| 2010/0254081 A1 | 10/2010 | Koenig et al. | |
| 2010/0282439 A1 | 11/2010 | Summerer | |
| 2011/0108239 A1 | 5/2011 | Bruno et al. | |
| 2011/0151764 A1 | 6/2011 | Kastell et al. | |
| 2011/0298315 A1 | 12/2011 | Fulton | |
| 2012/0023939 A1* | 2/2012 | Kley | F16H 57/0447 60/624 |
| 2012/0192578 A1 | 8/2012 | Finney | |
| 2012/0199313 A1* | 8/2012 | Frainet | F01P 7/165 165/11.1 |
| 2012/0305226 A1 | 12/2012 | Chamberlin et al. | |
| 2013/0061611 A1 | 3/2013 | Dittmar et al. | |
| 2013/0214624 A1 | 8/2013 | Kubes et al. | |
| 2013/0277009 A1 | 10/2013 | Army | |
| 2013/0300120 A1 | 11/2013 | Podrog | |
| 2013/0334912 A1 | 12/2013 | Chiba et al. | |
| 2014/0318132 A1 | 10/2014 | Podrog | |
| 2016/0376021 A1* | 12/2016 | Ullyott | F02B 41/10 60/783 |
| 2017/0225794 A1* | 8/2017 | Waltner | B64D 35/08 |
| 2017/0291712 A1 | 10/2017 | Himmelmann et al. | |
| 2017/0305559 A1 | 10/2017 | Bruno et al. | |
| 2017/0306786 A1 | 10/2017 | Bruno et al. | |
| 2018/0050810 A1 | 2/2018 | Niergarth et al. | |
| 2018/0050811 A1 | 2/2018 | Niergarth et al. | |
| 2019/0010866 A1 | 1/2019 | Snyder et al. | |
| 2019/0014687 A1 | 1/2019 | Snyder | |

FOREIGN PATENT DOCUMENTS

| | | |
|---|---|---|
| DE | 102010021890 A1 | 12/2011 |
| DE | 102010034830 A1 | 2/2012 |
| DE | 102011105968 A1 | 1/2013 |
| EP | 1947008 A1 | 7/2008 |
| EP | 2458717 A2 | 5/2012 |
| EP | 3252930 A1 | 12/2017 |
| JP | 2006231974 A | 9/2006 |
| JP | 2009187756 A | 8/2009 |
| JP | 2016001589 A | 1/2016 |
| KR | 20060094418 A | 8/2006 |

* cited by examiner

CIRCULATING COOLANT FLUID IN HYBRID ELECTRICAL PROPULSION SYSTEMS

CROSS REFERENCE TO RELATED APPLICATIONS

This application claims the benefit of and priority to U.S. Provisional Patent Application No. 62/812,439, filed Mar. 1, 2019, the disclosure of which is hereby incorporated by reference in its entirety.

BACKGROUND OF THE INVENTION

1. Field of the Invention

The present disclosure relates to aircraft engines, and more particularly to hybrid aircraft engines.

2. Description of Related Art

Aircraft engines vary in efficiency and function over a plurality of parameters, such as thrust requirements, air temperature, air speed, altitude, and the like. Aircraft require the most thrust at take-off, wherein the demand for engine power is the heaviest. However, during the remainder of the mission, the aircraft engines often do not require as much thrust as during take-off. The size and weight of the engines allows them to produce the power needed for take-off, however after take-off the engines are in effect over-sized for the relatively low power required to produce thrust for cruising in level flight.

The conventional techniques have been considered satisfactory for their intended purpose. However, there is an ever present need for improved aircraft engines. This disclosure provides a solution for this need.

SUMMARY OF THE INVENTION

A hybrid propulsion system includes a heat engine configured to drive a heat engine shaft. An electric motor configured to drive a motor shaft. A transmission system is connected to receive rotational input power from each of the heat engine shaft and the motor shaft and to convert the rotation input power to output power. A first lubrication/coolant system is connected for circulating a first lubricant/coolant fluid through the heat engine. A second lubricant/coolant system in fluid isolation from the first lubrication/coolant system is connected for circulating a second lubricant/coolant fluid through the electric motor. For example, the first lubricant/coolant can be more viscous than the second lubricant/coolant.

A turbine gearbox can connect between the heat engine and a shaft for rotation of a compressor and a turbine at a rotational speed different from that of the heat engine. A pressure pump can be operatively connected to be powered by the turbine gearbox, wherein the pressure pump is connected in a coolant line of the first lubrication/coolant system between a sump tank and the heat engine for driving flow of the first lubricant/coolant from the sump tank to the heat engine. A cooler can be included in the coolant line between the sump tank and the heat engine downstream of the pressure pump for cooling the first lubricant/coolant with a flow of ambient air. A filter, coolant pressure sensor, and/or a coolant temperature sensor can be included in the coolant line between the sump tank and the heat engine.

The coolant line can branch into respective coolant sub-lines connected for circulating the first lubricant/coolant to the heat engine, the turbine gearbox, the compressor, and the turbine. The coolant line can include a coolant sub-line that connects through hydraulic motor to the sump tank.

A plurality of scavenge passages can connect for return of the first lubricant/coolant fluid from the heat engine, the turbine gearbox, the compressor, and the turbine. A respective scavenge passage from the compressor to the sump tank can include a first scavenge pump operatively connected a hydraulic motor to drive scavenge flow of the first lubricant/coolant from the compressor to the sump tank. A respective scavenge passage from the turbine to the sump tank can include a second scavenge pump operatively connected the hydraulic motor to drive scavenge flow of the first lubricant/coolant from the turbine to the sump tank.

A chip detector can be included in a line downstream from at least one of the first and second scavenge pumps. The pressure pump can provide driving potential for the first lubrication/coolant system entirely. The pressure pump can be located in a u-bend in the coolant line. The sump tank can include an anti-siphon device connected to the coolant line. It is also contemplated that there can be no anti-siphon device included connecting the sump tank to the coolant line, and that a chip detector can be included within the sump tank.

A first scavenge passage from the compressor to the sump tank can include a first scavenge pump operatively connected the turbine gearbox to drive scavenge flow of the first lubricant/coolant from the compressor to the sump tank. A second scavenge passage from the turbine to the sump tank can include a second scavenge pump operatively connected the turbine gearbox to drive scavenge flow of the first lubricant/coolant from the turbine to the sump tank. A third scavenge passage from the heat engine to the sump tank can include a third scavenge pump operatively connected to the turbine gearbox to drive scavenge flow of the first lubricant/coolant from the heat engine to the sump tank. The sump tank can include a partition for consolidating scavenge flows from the heat engine into the third scavenge passage, and separating the scavenge flows from the heat engine from a main sump volume fed by the first, second, and third scavenge pumps. A chip sensor can be included in the third scavenge line.

A combining gearbox can be connected to the heat engine and to the electric motor for combining power from the heat engine and electric motor to provide output power. A pressure pump can be operatively connected to be powered by the combining gearbox. The pressure pump can be connected in a coolant line of the second lubricant/coolant system between a sump tank and the electric motor for driving flow of the second lubricant/coolant from the sump tank to the electric motor.

The coolant line can include a cooler for cooling the second lubricant/coolant with ambient air. The coolant line can branch to supply the second lubricant/coolant to the combining gearbox and to the electric motor. A scavenge passage can operatively connect between a sump tank of the second lubricant/coolant system and the electric motor and the combining gearbox, wherein a scavenge pump is included in the scavenge passage. A reduction gearbox can be operatively connected to receive power output from the combining gearbox, wherein the coolant line includes a branch for supplying the second lubricant/coolant to the reduction gearbox. A scavenge passage branch can connect between the reduction gearbox and the scavenge passage. A second scavenge pump can be included in the scavenge passage branch for driving flow from the reduction gearbox to the sump tank.

A third coolant system can be connected for circulating a third coolant fluid through the heat engine. A compressor can connect through an air line to supply boost air to the heat engine. The air line can include an intercooler for cooling the compressed air. The third coolant system can be connected to the intercooler for heat exchange between the third coolant and the compressed air. The heat engine shaft and the motor shaft can be combined as a single common shaft connected to the transmission system.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
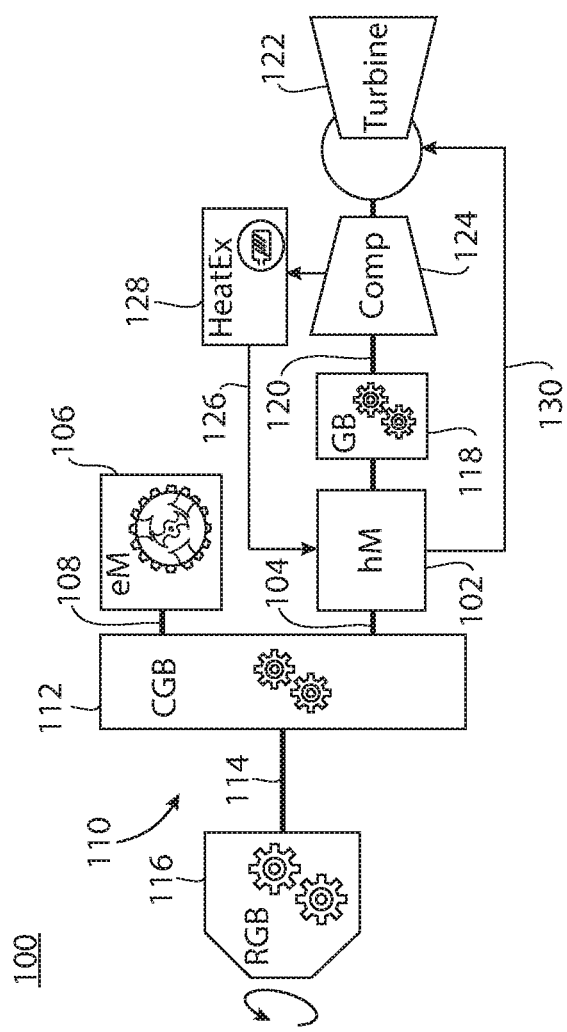
FIG. 1 is a schematic view of an exemplary embodiment of a hybrid propulsion system constructed in accordance with the present disclosure, showing a first gearbox arrangement.

Reference will now be made to the drawings wherein like reference numerals identify similar structural features or aspects of the subject disclosure. For purposes of explanation and illustration, and not limitation, a partial view of an exemplary embodiment of the a hybrid propulsion system in accordance with the disclosure is shown in FIG. 1 and is designated generally by reference character 100. Other embodiments of systems in accordance with the disclosure, or aspects thereof, are provided in FIGS. 2-5, as will be described. The systems and methods described herein can be used to provide hybrid propulsion, e.g., for improving fuel efficiency in aircraft.

The hybrid propulsion system 100 includes a heat engine 102 configured to drive a heat engine shaft 104. An electric motor 106 is configured to drive a motor shaft 108. A transmission system 110 is configured to receive rotational input power from each of the heat engine shaft 104 and the motor shaft 108 and to convert the rotation input power to output power, as indicated by the circular arrow in FIG. 1.

The transmission system 110 includes a combining gearbox 112 connecting to the heat engine shaft 104 and to the motor shaft 108 to combine rotational input power from the heat engine 102 and electric motor 106 for providing rotational output power to an output shaft 114, which can drive a reduction gearbox 116 for turning an aircraft propeller, fan, or any other suitable type of air mover for example. It is also contemplated that the engine shaft 104 and motor shaft 108 can be a single common shaft, e.g., by relocating the electric motor 106 in FIG. 1 to be on the heat engine shaft 104. A turbine gearbox 118 is included, which is connected between the heat engine shaft 104 and a shaft 120 for rotation of a turbine 122 and a compressor 124 at a different rotational speed from the heat engine 102.

The compressor 124 compresses air and supplies the compressed air to the heat engine 102 through the air line 126, which includes an intercooler 128 for cooling the compressed air. After combustion in the heat engine 102, the combustion products are supplied through a combustion products line 130 to the turbine 122, which extracts power from the compressed combustion products before exhausting them. The electric motor 106 can be powered to boost horse power, e.g., for take-off, in parallel with the heat motor 102, and can be powered down or can be operated as a generator, e.g., for cruising in level flight, where only the heat motor 102 is needed for power. The compressor 124 and turbine 122 improve the thermal efficiency of the heat engine 102. The system 100 includes a first lubrication/coolant system 132, shown in FIG. 2, which is connected for circulating a first lubricant/coolant fluid through the heat engine 102. A second lubricant/coolant system 134, shown in FIG. 5, in fluid isolation from the first lubrication/coolant system 132 is connected for circulating a second lubricant/coolant fluid through the electric motor 106. This fluid isolation between the first and second lubricant/coolant systems 132 and 134 allows for use of a first lubricant/coolant is more viscous than the second lubricant/coolant, for example. The system 100 also includes a third coolant system 400, shown in FIG. 6, in fluid isolation from the first and second lubricant/coolant systems 132, 134.

Figure 2:
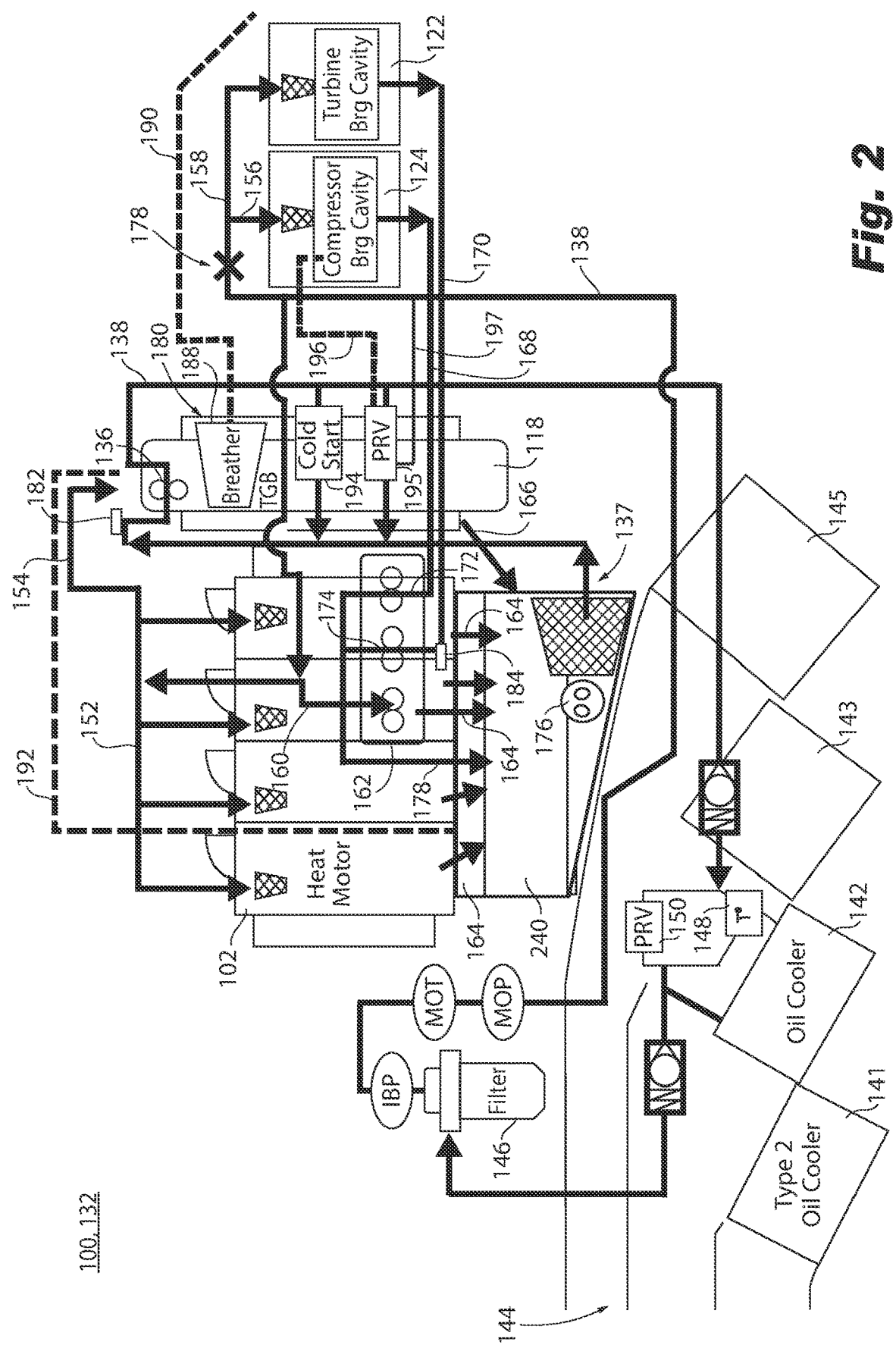
FIG. 2 is a schematic view of the system of FIG. 1, showing the first lubrication/coolant system.

With reference now to FIG. 2, the first lubrication/coolant system 132 includes a pressure pump 136 that is operatively connected to be powered by the turbine gearbox 118. The pressure pump 136 is connected in a coolant line 138 of the first lubrication/coolant system 132 between a sump tank 240 and the heat engine 102 for driving flow of the first lubricant/coolant from the sump tank 240 to the heat engine 102. A cooler 142 is included in the coolant line 138 between the sump tank 240 and the heat engine 102 downstream of the pressure pump 136 for cooling the first lubricant/coolant, e.g., with a flow of ambient air through an aircraft nacelle 144. A filter 146 is included in the coolant line 138 between the sump tank 240 and the heat engine 102 downstream of the cooler 142. This location of the filter 146 protects the heat engine 102 from any debris in the cooler 142 (e.g., left over from manufacturing process), and allows lower temperature filter media to be used. This being said, it is also contemplated that the filter 146 can be located upstream of cooler 142 in the line 138 such that the filter 142 runs hotter and therefore receives less viscous lubricant/coolant to reduce the pressure loss through the filter 142.

A three way bypass valve 148 is positioned to apportion flow at the junction between the bypass line in parallel with the pressure relief valve 150, and the line including the cooler 142. The valve 148 is a thermostatic valve to by-pass the cooler 142 when the first lubricant/coolant does not need to be cooled. The valve 148 gradually closes the passage to the cooler 142 as the passage to the by-pass (through the pressure relief valve 150) opens. Three sensors in the line 138 are downstream of the filter 146 in the ellipses marked IBP (Impending By-pass Indicator), MOP (Main Oil Pressure) and MOT (Main Oil Temperature).

The coolant line 138 branches into respective coolant sub-lines 152, 154, 156, 158 connected for circulating the first lubricant/coolant to the heat engine 102, the turbine gearbox 118, the compressor 124, and the turbine 122, respectively. The coolant line 138 includes a coolant sub-line 160 that connects through a hydraulic motor 162 to the sump tank 240.

A plurality of scavenge passages 164, 166, 168, 170 connect for return of the first lubricant/coolant fluid from the heat engine, the turbine gearbox, the compressor, and the turbine, respectively, to the sump tank 240. A respective scavenge passage 168 from the compressor to the sump tank includes a first scavenge pump 172 operatively connected the hydraulic motor 162 to drive scavenge flow of the first lubricant/coolant from the compressor 124 to the sump tank 240. A respective scavenge passage 170 from the turbine 120 to the sump tank 240 includes a second scavenge pump 174 operatively connected the hydraulic motor 162 to drive scavenge flow of the first lubricant/coolant from the turbine 122 to the sump tank 240. The pressure pump 136 provides the driving potential for the first lubrication/coolant system 132 entirely since the hydraulic motor 162 is powered by flow through the coolant line 138, which is driven by the pressure pump 136. The pressure pump 136 is located in a u-bend 180 in the coolant line 138 to help prevent de-priming. A fill cap 182 is included in the coolant line 138 adjacent the u-bend, and another fill cap 184 is included in the sump tank 240.

A breather 188 is included in the turbine gear box 118, connecting to an air line 190 for removal of air from the first lubrication/coolant system 132. Another air line 192 connects between the sump tank 240 and the turbine gear box 118 for removal of air from the sump tank 240 through the air lines 190 and 192. A cold start bypass valve 194 is included in the coolant line 138, bypassing the coolers 142, heat engine 102, turbine gear box 118, compressor 124, and turbine 122. A pressure regulating valve (or pressure adjusting valve) 195 is included in the coolant line 138 in parallel with the cold start bypass valve 192. The pressure regulating valve 195 is connected to an air line 196 leading to the coolant cavity of the compressor 124, and a tap 197 to the coolant line 138 downstream of the filter 146. Automotive oil meeting the system requirements of the mechanical system can be used as the first lubricant/coolant.

A restrictor 198 is included just upstream of where the coolant line 138 branches to the sub-lines 156, 158. One of the coolers 142 is positioned in parallel with the sensor 18 and pressure relieve valve 150. The chip detector 176 can be located inside the sump tank 240 near the outlet 137 of the sump tank 240.

Figure 3:
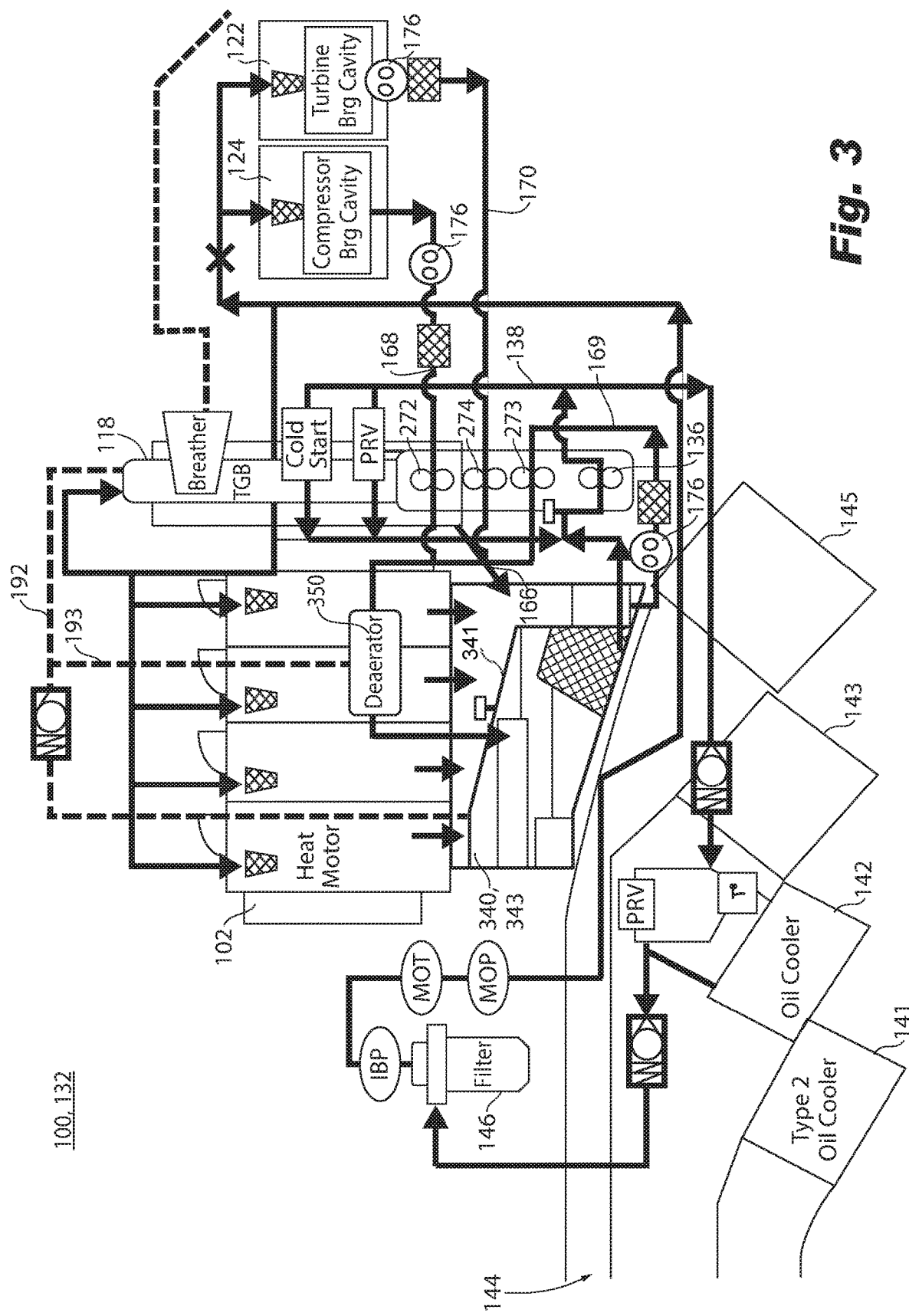
FIG. 3 is a schematic view of the system of FIG. 1, showing another configuration of the first lubrication/coolant system.

With reference now to FIG. 3, the first lubrication/coolant system 132 is shown with another configuration, in which the scavenge pumps are powered by the turbine gear box 118. The first scavenge passage 168 from the compressor 124 to the sump tank 340 includes a first scavenge pump 272 operatively connected the turbine gearbox 118 to drive scavenge flow of the first lubricant/coolant from the compressor 122 to the sump tank 340. A second scavenge passage 170 from the turbine 122 to the sump tank 340 includes a second scavenge pump 274 operatively connected the turbine gearbox 118 to drive scavenge flow of the first lubricant/coolant from the turbine 124 to the sump tank 340. A third scavenge passage 169 from the heat engine 102 to the sump tank 340 includes a third scavenge pump 273 operatively connected to the turbine gearbox 118 to drive scavenge flow of the first lubricant/coolant from the heat engine 102 to the sump tank 340. The sump tank 340 includes a partition 341 for consolidating scavenge flows from the heat engine 102 and the turbine gearbox 118 into the third scavenge passage 169 (the turbine gearbox 118 drains by gravity into the collector formed by partition 341), and separating the scavenge flows coming directly from the heat engine 102 from a main sump volume 343 fed by the first, second, and third scavenge pumps 272, 273, 274 through the deaerator 350, which removes air from the scavenge flow to the air line 192 through air line 193. A chip sensor 176 is included in each of the scavenge lines 168, 169, 170.

Figure 4:
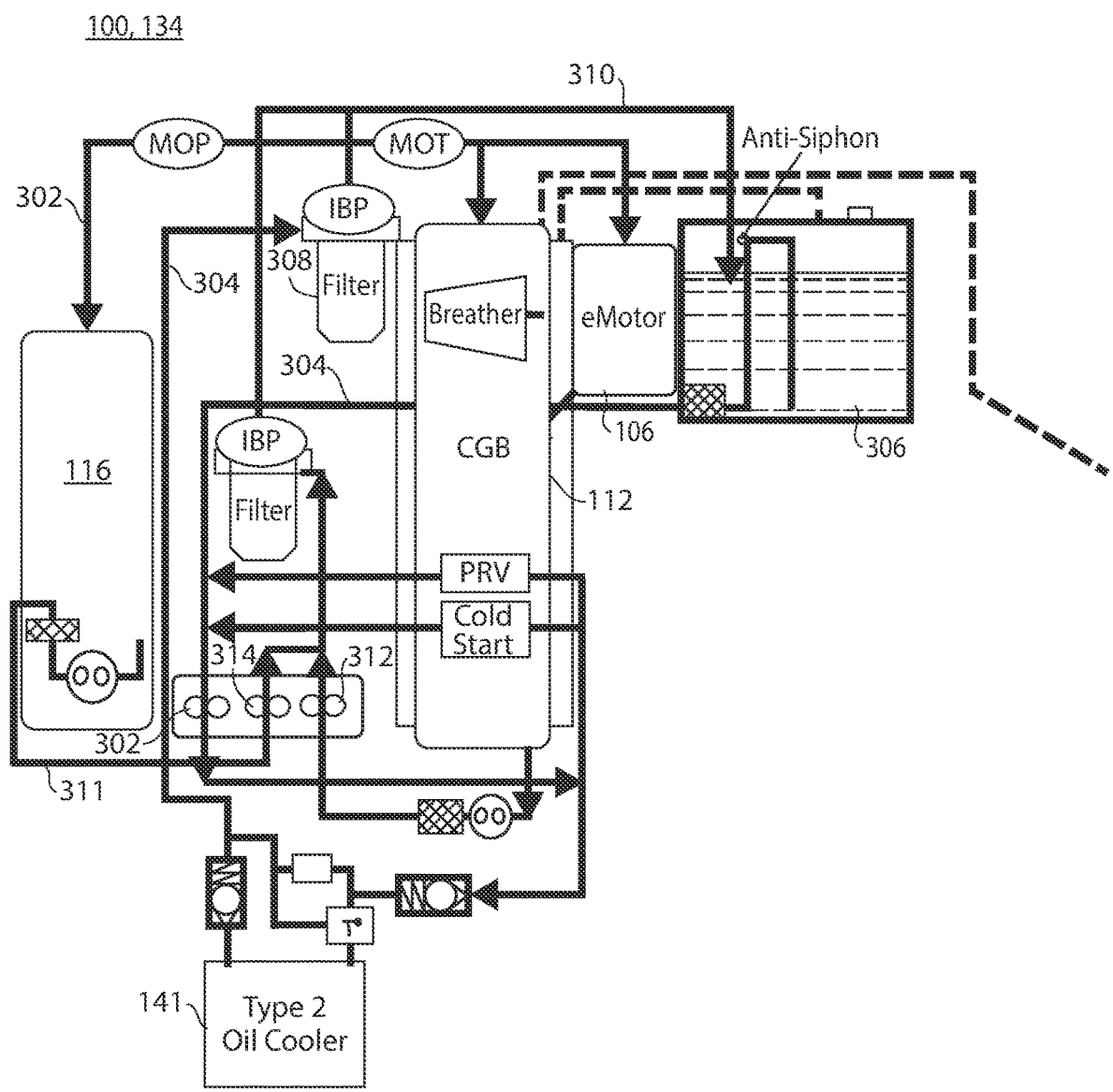
FIG. 4 is a schematic view of the system of FIG. 1, showing the second lubricant/coolant system.

With reference now to FIG. 4, the second lubricant/coolant system 134 includes a pressure pump 302 operatively connected to be powered by the combining gear box 112. The pressure pump 302 is connected in a coolant line 304 of the second lubricant/coolant system 134 between a sump tank 306 and the electric motor 106 for driving flow of the second lubricant/coolant from the sump tank 306 to the electric motor 106.

The coolant line 304 includes a cooler 141 for cooling the second lubricant/coolant with ambient air similar to cooler 142 described above. The coolant line 304 branches, i.e., just above the filter 308 in line 304 as oriented in FIG. 4, to supply the second lubricant/coolant to the combining gearbox 112, the reduction gear box 116, and to the electric motor 106. The coolant line 310 includes a branch 309 for supplying the second lubricant/coolant to the reduction gearbox 116. A scavenge passage 310 operatively connects between the sump tank 306 and the electric motor 106, reduction gear box 116, and the combining gearbox 112. The scavenge pump 312 is included in the scavenge passage 310, and a second scavenge pump 314 collects from a scavenge line branch 311. The flows from the two scavenge pumps 312 and 314 are combined into scavenge line 310. Both scavenge pumps 312 and 314 are connected to be driven by the combining gear box 112.

Figure 5:
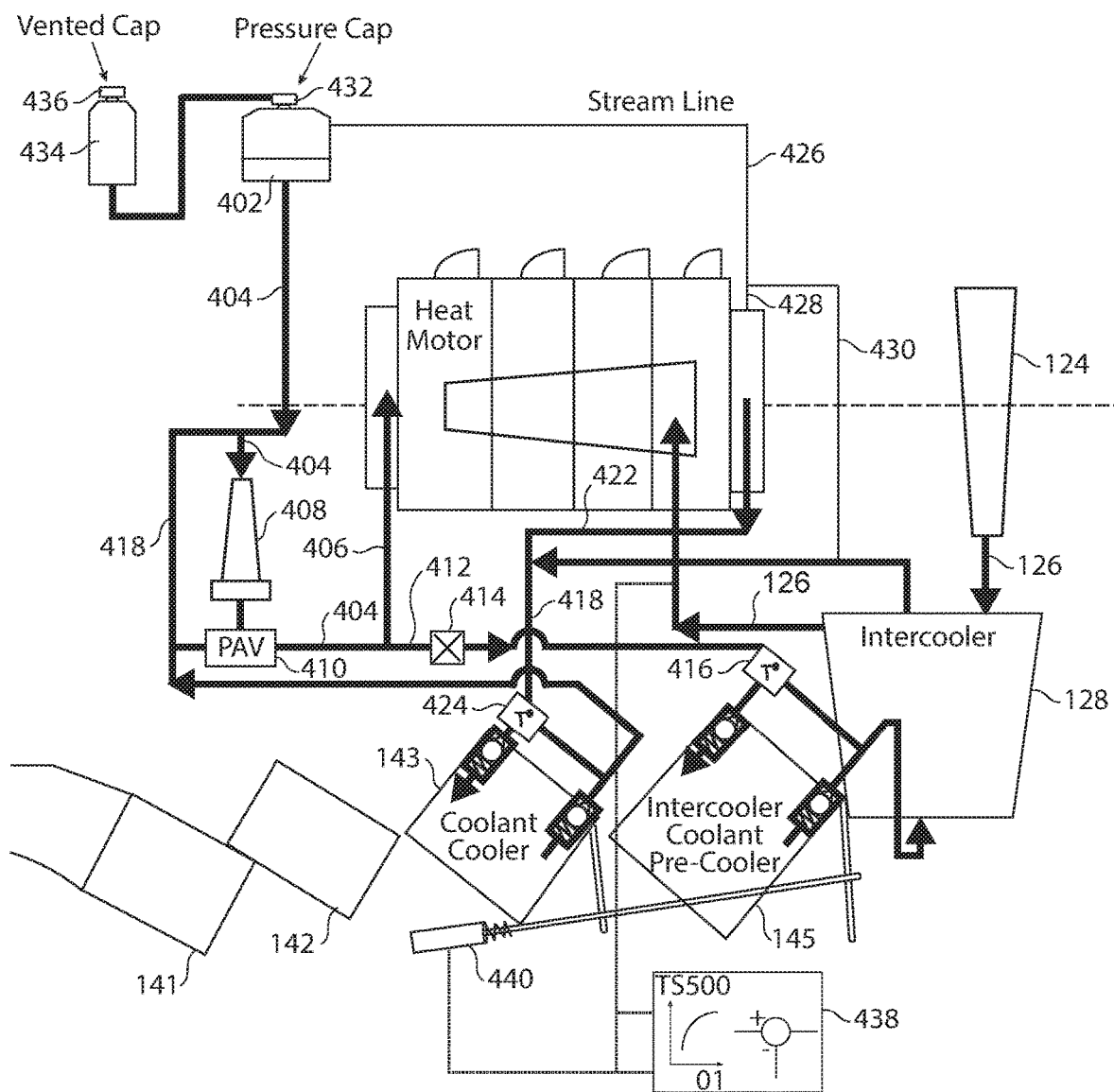
FIG. 5 is a schematic view of the system of FIG. 1, showing the third coolant system.

With reference now to FIG. 5, the third coolant system 400 is connected for circulating a third coolant fluid, e.g., water or glycol, through the heat engine 102 and intercooler 128. The third coolant system 400 can be connected to the intercooler 128 for heat exchange between the third coolant and the compressed air.

The expansion tank 402 supplies a coolant line 404, which is pressurized by a pump 408 and pressure adjusting vale 410 (which could be a simple orifice instead in certain applications) in the coolant line 404. One branch 406 of the coolant line 404 supplies the third coolant to the heat engine 102. Another branch 412 supplies coolant to the intercooler 128. A fixed orifice 414 apportions the flow between the two branches 406 and 412. The branch 412 includes a pre-cooler 145 and three-way thermal valve 416 (which functions similar to valve 148 described above) for pre-cooling the third coolant prior to the third coolant cooling the intercooler 128. It is contemplated that the valve 416 can optionally be an active valve to enable reduction of the coolant flow to the cooler 145 when engine controls determine it would be more efficient to run the turbine 122 at a higher turbine entry temperature (T3500 in FIG. 5). After cooling the heat engine 102 and intercooler 128, the third coolant is gathered into a return line 418 through branches 420 and 422. The return line 418 passes the third coolant through the coolant cooler 143 and three-way thermal valve 424 (which functions similar to valves 148 and 416 described above) and returns the third coolant to the pump 408. A steam line 426 collects steam from the two branches 428 and 430 to return a vapor portion of the third coolant to the expansion tank 402. The expansion tank includes a pressure cap 432, which connects to a recovering tank 434, which has a vented cap 436. A controller 438 connects to the line 126 and an actuator 440 to control flow through the coolers 143 and 145.

The first lubricant/coolant, described with respect to FIGS. 2-3 can provide lubrication and some cooling, e.g. for bearings and gears, in the heat engine 102, compressor 124, turbine 122, and turbine bear box 118. The second lubricant/coolant, described above with respect to FIG. 4, can provide lubrication and some cooling for the electric motor 106, the combined gearbox 112, and the reduction gear box 116. The third coolant, described above with respect to FIG. 5, can be used for primary cooling of the heat engine 102 and intercooler 128.

Using more than one lubrication/coolant fluid allows optimization of the lubrication and cooling in functions of the specific needs of the various mechanical elements. Those skilled in the art having had the benefit of this disclosure will readily appreciate that it is possible to design a system using only one lubrication/coolant fluid for all three systems 132, 134, 400.

The methods and systems of the present disclosure, as described above and shown in the drawings, provide for propulsion systems with superior properties including use of hybrid heat engine and electric motor power. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A hybrid propulsion system comprising:
a heat engine configured to drive a heat engine shaft;
an electric motor configured to drive a motor shaft;
a transmission system connected to receive rotational input power from each of the heat engine shaft and the motor shaft and to convert the rotation input power to output power;
a first lubrication/coolant system connected for circulating a first lubricant/coolant fluid through the heat engine;
a second lubricant/coolant system in fluid isolation from the first lubrication/coolant system, wherein the second lubricant/coolant system is connected for circulating a second lubricant/coolant fluid through the electric motor;
a turbine gearbox connecting between the heat engine and a shaft for rotation of a compressor and a turbine at a rotational speed different from that of the heat engine; and
a pressure pump operatively connected to be powered by the turbine gearbox, wherein the pressure pump is connected in a coolant line of the first lubrication/coolant system between a sump tank and the heat engine for driving flow of the first lubricant/coolant from the sump tank to the heat engine.

2. The system as recited in claim 1, further comprising: a cooler in the coolant line between the sump tank and the heat engine downstream of the pressure pump for cooling the first lubricant/coolant with a flow of ambient air.

3. The system as recited in claim 2, further comprising:
a filter in the coolant line between the sump tank and the heat engine; and/or
a coolant pressure sensor in the coolant line between the sump tank and the heat engine downstream of the cooler; and/or
a coolant temperature sensor in the coolant line between the sump tank and the heat engine downstream of the cooler.

4. The system as recited in claim 1, wherein the coolant line branches into respective coolant sub-lines connected for circulating the first lubricant/coolant to the heat engine, the turbine gearbox, the compressor, and the turbine.

5. The system as recited in claim 4, wherein the coolant line includes a coolant sub-line that connects through a hydraulic motor to the sump tank.

6. The system as recited in claim 4, further comprising a plurality of scavenge passages connecting for return of the first lubricant/coolant fluid from the heat engine, the turbine gearbox, the compressor, and the turbine.

7. The system as recited in claim 6, wherein a respective scavenge passage from the compressor to the sump tank includes a first scavenge pump operatively connected a hydraulic motor to drive scavenge flow of the first lubricant/coolant from the compressor to the sump tank, and wherein a respective scavenge passage from the turbine to the sump tank includes a second scavenge pump operatively connected the hydraulic motor to drive scavenge flow of the first lubricant/coolant from the turbine to the sump tank.

8. The system as recited in claim 7, further comprising a chip detector in a line downstream from at least one of the first and second scavenge pumps.

9. The system as recited in claim 1, wherein the pressure pump provides driving potential for the first lubrication/coolant system entirely.

10. The system as recited in claim 1, wherein the pressure pump is located in a u-bend in the coolant line.

11. The system as recited in claim 1, wherein the sump tank includes an anti-siphon device connected to the coolant line.

12. The system as recited in claim 1, wherein no anti-siphon device is included connecting the sump tank to the coolant line, and wherein a chip detector is included within the sump tank.

13. The system as recited in claim 1, further comprising:
a first scavenge passage from the compressor to the sump tank including a first scavenge pump operatively connected the turbine gearbox to drive scavenge flow of the first lubricant/coolant from the compressor to the sump tank;
a second scavenge passage from the turbine to the sump tank including a second scavenge pump operatively connected the turbine gearbox to drive scavenge flow of the first lubricant/coolant from the turbine to the sump tank; and
a third scavenge passage from the heat engine to the sump tank including a third scavenge pump operatively connected to the turbine gearbox to drive scavenge flow of the first lubricant/coolant from the heat engine to the sump tank.

14. The system as recited in claim 13, wherein the sump tank includes a partition for consolidating scavenge flows from the heat engine into the third scavenge passage, and separating the scavenge flows from the heat engine from a main sump volume fed by the first, second, and third scavenge pumps, and further comprising a chip sensor in the third scavenge line.

15. A hybrid propulsion system comprising:
a heat engine configured to drive a heat engine shaft;
an electric motor configured to drive a motor shaft;

a transmission system connected to receive rotational input power from each of the heat engine shaft and the motor shaft and to convert the rotation input power to output power;

a first lubrication/coolant system connected for circulating a first lubricant/coolant fluid through the heat engine;

a second lubricant/coolant system in fluid isolation from the first lubrication/coolant system, wherein the second lubricant/coolant system is connected for circulating a second lubricant/coolant fluid through the electric motor;

a combining gearbox connected to the heat engine and to the electric motor for combining power from the heat engine and electric motor to provide output power; and a pressure pump operatively connected to be powered by the combining gear box, wherein the pressure pump is connected in a coolant line of the second lubricant/coolant system between a sump tank and the electric motor for driving flow of the second lubricant/coolant from the sump tank to the electric motor.

16. The system as recited in claim 15, wherein the coolant line includes a cooler for cooling the second lubricant/coolant with ambient air, and wherein the coolant line branches to supply the second lubricant/coolant to the combining gearbox and to the electric motor.

17. The system as recited in claim 16, further comprising a scavenge passage operatively connecting between a sump tank of the second lubricant/coolant system and the electric motor and the combining gearbox, wherein a scavenge pump is included in the scavenge passage.

18. The system as recited in claim 17, further comprising:

a reduction gearbox operatively connected to receive power output from the combining gearbox, wherein the coolant line includes a branch for supplying the second lubricant/coolant to the reduction gearbox;

a scavenge passage branch connecting between the reduction gearbox and the scavenge passage; and a second scavenge pump in the scavenge passage branch for driving flow from the reduction gearbox to the sump tank.

19. The system as recited in claim 1, further comprising a third coolant system connected for circulating a third coolant fluid through the heat engine.

20. The system as recited in claim 19, further comprising a compressor connected through an air line to supply boost air to the heat engine, wherein the air line includes an intercooler for cooling the compressed air, wherein the third coolant system is connected to the intercooler for heat exchange between the third coolant and the compressed air.

21. The system as recited in claim 1, wherein the heat engine shaft and the motor shaft are combined as a single common shaft connected to the transmission system.

* * * * *